US010033609B1

(12) United States Patent
Tali

(10) Patent No.: US 10,033,609 B1
(45) Date of Patent: Jul. 24, 2018

(54) LOW IMPACT PASSIVE MONITORING OF APPLICATION PERFORMANCE

(71) Applicant: CA, Inc., Islandia, NY (US)

(72) Inventor: Martin Tali, Foster City, CA (US)

(73) Assignee: CA, Inc., New York, NY (US)

( * ) Notice: Subject to any disclaimer, the term of this patent is extended or adjusted under 35 U.S.C. 154(b) by 428 days.

(21) Appl. No.: 13/889,076

(22) Filed: May 7, 2013

(51) Int. Cl.
G06F 15/16 (2006.01)
H04L 12/26 (2006.01)

(52) U.S. Cl.
CPC .................... H04L 43/0876 (2013.01)

(58) Field of Classification Search
CPC .................... H04L 67/22; G07C 5/008
See application file for complete search history.

(56) References Cited

U.S. PATENT DOCUMENTS

| | | | | |
|---|---|---|---|---|
| 6,085,243 A * | 7/2000 | Fletcher | | G06F 8/65 709/224 |
| 6,877,039 B2 * | 4/2005 | Larson et al. | | 709/237 |
| 7,035,214 B1 * | 4/2006 | Seddigh | | H04L 1/1635 370/231 |
| 7,684,347 B2 | 3/2010 | Merkey et al. | | |
| 7,822,867 B2 * | 10/2010 | Durrey et al. | | 709/231 |
| 8,576,722 B2 * | 11/2013 | Bugenhagen | | H04L 43/026 370/216 |
| 8,667,575 B2 * | 3/2014 | Thakur et al. | | 726/12 |
| 8,750,370 B2 * | 6/2014 | Nagapudi | | H04L 45/745 375/240.02 |
| 2005/0021821 A1 * | 1/2005 | Turnbull | | H04L 12/28 709/232 |
| 2013/0073729 A1 * | 3/2013 | Yun | | 709/225 |
| 2014/0226658 A1 * | 8/2014 | Kakadia et al. | | 370/389 |
| 2014/0258397 A1 * | 9/2014 | Heerboth | | H04L 12/12 709/204 |
| 2014/0280892 A1 * | 9/2014 | Reynolds et al. | | 709/224 |
| 2015/0012647 A1 * | 1/2015 | Grelewicz | | 709/224 |

OTHER PUBLICATIONS

Risso, et al., "An Architecture for High Performance Network Analysis", Proceedings of the Sixth IEEE Symposium on Computers and Communications, Jul. 2001, pp. 686-693, 8 pages.

(Continued)

*Primary Examiner* — Hamza N Algibhah
*Assistant Examiner* — Tesfu N Mekonen
(74) *Attorney, Agent, or Firm* — Vierra Magen Marcus LLP

(57) ABSTRACT

Techniques are disclosed herein for monitoring a software application. The software application may run on servers in a cloud environment. Remote packet capture may be used to capture packets at the servers and forward them over a network to a manager node. However, the forwarding of the packets could potentially impact the software application itself by, for example, overloading the network. This may especially be the case during times of spikes in network traffic. Resource conditions, such as network conditions, may be monitored to minimize the impact by reducing the amount of data packets forwarded, which allows the monitored application to operate normally under traffic spikes. Also, a tunnel protocol having low overhead may be used to reduce the impact of monitoring.

16 Claims, 11 Drawing Sheets

(56) References Cited

OTHER PUBLICATIONS

Degioanni, et al., "Profiling and Optimization of Software-Based Network-Analysis Applications", Proceedings of the 15th IEEE Symposium on Computer Architecture and High Performance Computing, Nov. 2003, pp. 226-234, 9 pages.

S. Krishnan, README for rpcap [online], [retrieved on Apr. 8, 2013] Retrieved from the Internet: <URL:http://rpcap.sourceforge.net/>, 4 pages.

Lamping, et al., "Wireshark User's Guide", for Wireshark 1.9, Feb. 2013, 256 pages.

\* cited by examiner

| Ping | Name | Description |
|---|---|---|
| Uint32 | Timeout | Ping interval for seconds. If Agent does not receive next Ping by specified time, it will shut down the tunnel and stop sending captured packets. |
| Uint32 | PacketLoss | Current packet loss from Agent observed by Manager |

Figure 4A

| Nack | Name | Description |
|---|---|---|
| Uint32[10] | MissingSeq | Array of sequence numbers that the Manager wants the Agent to resend. |

Figure 4B

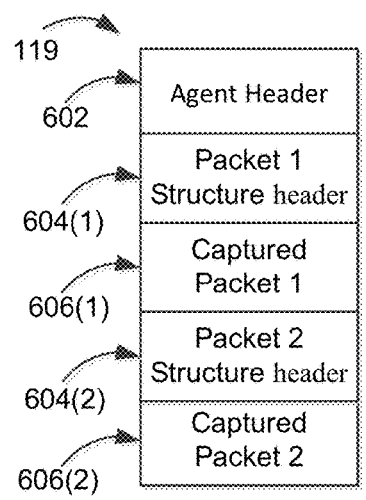
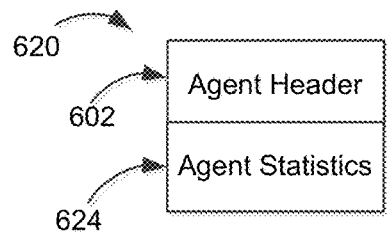
Figure 6B
Figure 6A
| 602 | | |
|---|---|---|
| Agentpacket | Name | Description |
| Uint16 | Sequence | Monotonically increasing sequence number starts at 1 and wraps. |
| Uint16 | Flags | See definitions in Fig 6D. |
Figure 6C

| FLAG | Description |
|---|---|
| FLAG_AGENT_SHUTDOWN | Agent has been shut down for bad network conditions. No data follows. |
| FLAG_AGENT_COMPRESSION | All content following this header is compressed |
| FLAG_AGENT_RESEND | This is a packet that is resent because of NACK command |
| FLAG_AGENT_STATS | This is a statistics message, instead of captured packets |

Figure 6D

Packet Structure Header  604

|  | Name | Description |
|---|---|---|
| Uint16 | Length | Length of following captured packet without this header. |
| Uint32 | Tv_sec | PCAP timestamp seconds. |
| Uint32 | Tv_usec | PCAP timestamp micro seconds. |

Figure 6E

Stats Structure Header  624

|  | Name | Description |
|---|---|---|
| Uint32 | Captured | Cumulative count of captured packets. |
| Uint32 | Dropped | Cumulative count of packets dropped by capture interface. |

Figure 6F

LOW IMPACT PASSIVE MONITORING OF APPLICATION PERFORMANCE

BACKGROUND

The present disclosure relates to monitoring performance of software applications.

Monitoring of software applications that execute on servers has been performed. One technique is to add, to the software application, agent code that traces transactions performed by the software application. The agent code collects transaction data such as the time that certain transactions took to execute and forwards that transaction data to a central node that analyzes the data and presents it to a user.

Another technique to monitor software applications that execute on various servers is to establish one point that can be used to capture network traffic. That captured traffic can be provided to a manager node that analyzes the traffic to determine things such as response time for performing various transactions. As one example, sometimes a single network switch can be used for "port mirroring". With port mirroring, a copy of network traffic seen on one switch port is forwarded on another switch port to allow monitoring. With port mirroring, the forwarded data packets need not be sent over a network, since the monitoring device may be connected directed to the port of the switch.

Port mirroring can work well provided that there is one point in the network that can serve as the point to capture traffic. For example, with traditional data centers there may be a single physical switch that can serve as the point to capture all traffic to all servers in the data center. That is, a customer premise installation can be made.

However, in some situations port mirroring is not suitable. For example, in a cloud environment there typically is not a single network switch that can be used for port mirroring for all of the servers in the cloud that are to be monitored.

BRIEF SUMMARY

According to one aspect of the present disclosure a software application is monitored. A communication tunnel between an agent on a first electronic device and a manager on a second electronic device is opened. The application to be monitored executes on the first electronic device. First packets that are associated with the application and are transferred on a network interface of the first electronic device are accessed. Second packets that comprise the first packets are formed by the agent. The second packets are transferred to the manager over the communication tunnel. The agent and/or the manager monitor resource conditions. The transferring of the second packets is modified based on the resource conditions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 4A is a keep-alive ping packet, in accordance with one embodiment.

FIG. 4B is a negative acknowledgment packet, in accordance with one embodiment.

FIG. 6A is a basic structure for one embodiment of an Agent packet that the Agent sends to the Manager.

FIG. 6B is a basic structure for one embodiment of a statistics packet that the Agent sends to the Manager.

FIG. 6C is a diagram of one embodiment of an Agent header.

FIG. 6D is a diagram of one embodiment flags of an Agent header.

FIG. 6E is a diagram of one embodiment of a packet structure header.

FIG. 6F is a diagram of one embodiment of a statistics structure.

DETAILED DESCRIPTION

Figure 1:
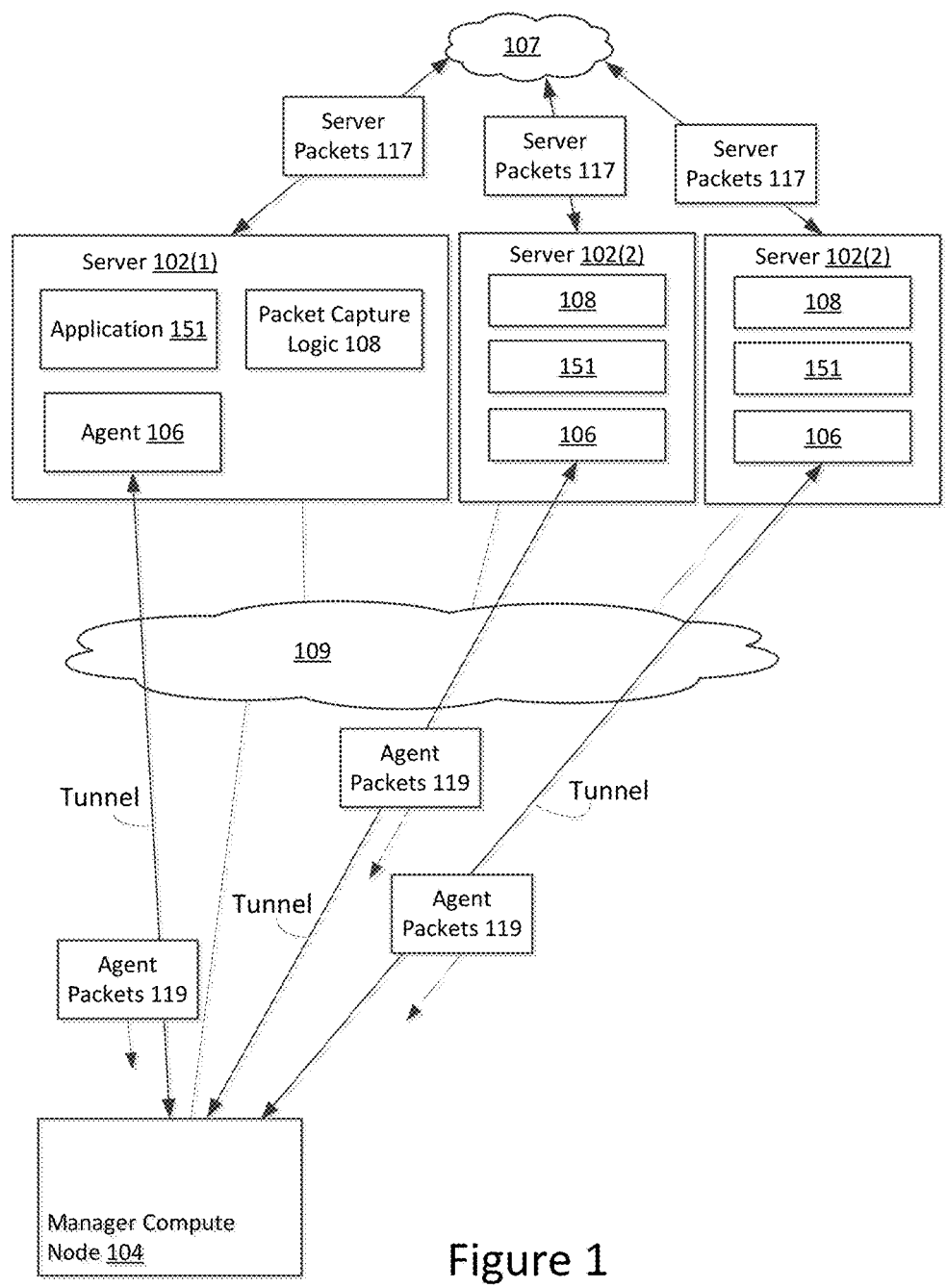
FIG. 1 is a diagram of an environment in which embodiments may be practiced.

Techniques are disclosed herein for monitoring a software application. In one embodiment, the software application runs on servers in a cloud environment. In one embodiment, remote packet capture is used to capture packets at the servers and forward them over a network to a manager node. However, the forwarding of the packets could potentially impact the software application itself by, for example, overloading the network. This may especially be the case during times of spikes in network traffic. In one embodiment, network conditions are monitored to minimize the impact by reducing the amount of data packets forwarded, which allows the monitored application to operate normally under traffic spikes. Also, a tunnel protocol having low overhead is provided for, in one embodiment, to reduce the impact of monitoring.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is a diagram of an environment in which embodiments may be practiced. In general, the environment includes a number of servers 102(1)-102(n) and a manager compute node 104. The servers 102(1)-102(n) and the manager 104 are each connected to network 109, in this embodiment. The network 109 could be any network including, but not limited to, the Internet, a local area network (LAN), and/or a wide area network (WAN).

The servers 102 each have a software application 151 executing thereon. The software application 151 on the different servers 102(1)-102(n) could be different instances of the same application. However, the software application 151 on one server 102 could be different from the software application 151 on another server 102. There could also be multiple different software applications 151 running on same server 102. The software applications 151 may process requests received from network 107 in the server packets 117. The software applications 151 may also send responses to the request in server packets 117 sent back to the network 107.

The network 107 could be any network including, but not limited to, the Internet, a local area network (LAN), and/or a wide area network (WAN). The networks 107 and 109 can be the same, overlapping or distinct. In one embodiment, network 107 is the Internet and network 109 is a LAN.

The servers 102 could provide an e-commerce web site, in which case the requests may be transactions such as a login transaction, purchase transaction, credit card check transaction, etc. Such transactions are referenced for the purpose of illustration. The performance of the software application 151 is monitored in accordance with embodiments. This may include determining how long it takes the application 151 to process the various types of transactions.

To monitor the software application 151, server packets 117 are captured at a network interface of the various servers 102 and forwarded to the manager compute node 104, in the Agent packets 119, in one embodiment. The server packets 117 may be captured by packet capture logic 108 on the servers 102. Logic for capturing packets is well-known to those of ordinary skill in the art.

The Agents 106 on the servers 102 may form Agent packets 119 from the server packets 117 and transfer the Agent packets 119 to the manager compute node 104 over network 109. A given Agent packet 119 could comprise the data from one or more server packets 117. In one embodiment, compression is used to allow more server packets 117 to be forwarded in a single Agent packet 119. This helps to reduce the impact that monitoring the application 151 has on network 109 and/or application 151 performance. Note that the various servers 102 may communicate with one another over network 109. Thus, degradation of network 109 performance may degrade application performance.

The manager compute node 104 analyzes the Agent packets 119 to generate performance statistics for the software application 151, in one embodiment. As one example, the manager node 104 analyzes HTTP headers that were from the server packets 117. Therefore, the manager compute node 104 is able to use remote packet capture to perform performance analysis.

It may be difficult to forward large quantities of captured packets over long distances. Therefore, the manager compute node 104 may be in the same local area network (LAN) as the servers 102, in one embodiment. The manager compute node 104 is able to communicate with the servers 102 without passing through a firewall, in one embodiment. In other words, there is not a firewall between the manager compute node 104 and a server 102, in one embodiment. This could apply to all servers 102, or some set of the server 102. The manager compute node 104 is able to communicate with the servers 102 without passing through a proxy, in one embodiment. In other words, there is not a proxy between the manager compute node 104 and a server 102, in one embodiment. This could apply to all servers 102, or some set of the server 102. The foregoing conditions can make forwarding of the captured packets (e.g., packets 117) more feasible, but are not absolute requirements.

In one embodiment, each Agent 106 and Manager 104 set up a communication tunnel between them over which to communicate. The communication tunnel provides for a lightweight communication protocol, in one embodiment. The Agent 106 sends the Agent packets 119 over the tunnel, as well as other packets. The Manager 104 may send packets to the Agents 106 from time to time, as will be further discussed below.

The transfer of the Agent packets 119 could add to overall network congestion. It is desired to not negatively impact the performance of the application 151 or in some way hinder the overall performance provided by the application 151. Therefore, the Agents 106 and/or Manager 1014 may monitor resource conditions and modify how the Agent packets 119 are transferred based on resource conditions. As one example, if network 107 is congested, then the Agents 106 may stop or reduce transferring the Agent packets 119. As another example, if network 109 is congested, then the Agents 106 may stop or reduce transferring the Agent packets 119. As still another example, if the Agents 106 are utilizing too much CPU time on the servers 102, then the Agents 106 may stop or reduce transferring the Agent packets 119. The Agents 106 could reduce the number of Agent packets 119 sent by only send high priority data, as one example.

In one embodiment, the Agents 106 send the Agent packets 119 using UDP (User Datagram Protocol). Since UDP does not use positive acknowledgement of packet reception, this can help to reduce network traffic to reduce the impact of sending the Agent packets 119. It is possible that this may be somewhat less reliable than using TCP (Transmission Control Protocol), which may require the recipient to send an acknowledgment upon receiving a packet. However, this helps to minimize the impact on application performance.

In one embodiment, the servers 102 are in a cloud environment. The manager 104 may be part of that cloud environment. In a traditional data center environment, there may be a suitable point for a single physical network switch to perform port mirroring for all of the network traffic received by all of the servers 102. Thus, it may be practical to obtain a copy of all packets that enter and/or leave the data center via port mirroring.

However, in a cloud environment it may be that there is no suitable point for a single physical network switch to perform port mirroring for all of the network traffic received by all of the servers 102. In this example, the network traffic being referred to is the packets 117 received by the servers 102 from network 107 and/or packets 117 sent from the servers 102 to network 107. Therefore, port mirroring may not be a viable option for performance monitoring in this environment. The capture of the packets at each of the servers 102 and forwarding to the manager compute node 104 allows for a central location to analyze and report application performance without the need for port mirroring.

Figure 2:
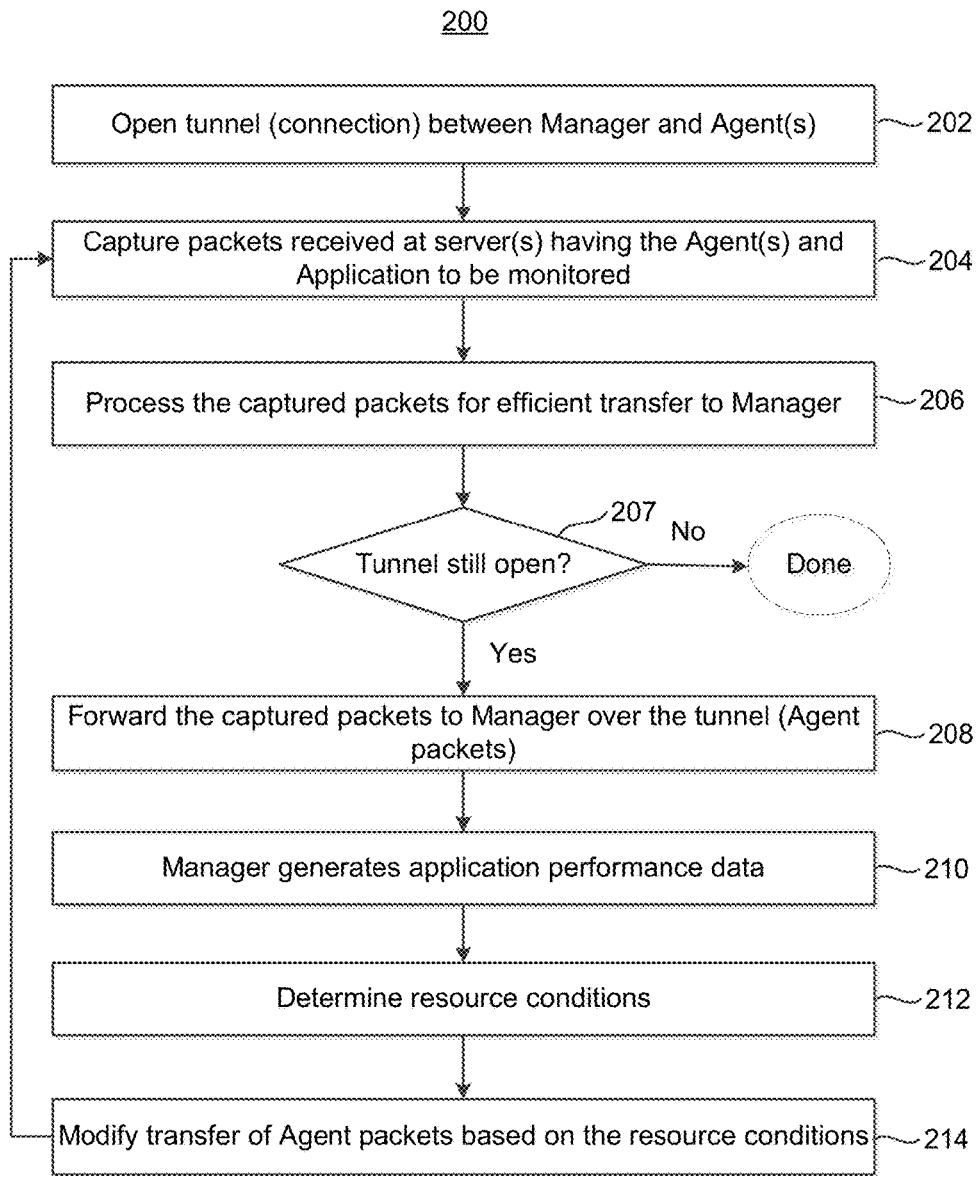
FIG. 2 is a flowchart of one embodiment of a process of monitoring a software application.

FIG. 2 is a flowchart of one embodiment of a process 200 of monitoring a software application 151. The process 200 could be performed in an environment such as the one depicted in FIG. 1. The process 200 provides allows a manager compute node 104 to employ remote packet capture for application performance monitoring. However, steps may be taken to minimize negative impact the monitoring has on application performance.

In step 202, a separate communication tunnel is established between the Manager 104 and each of the Agents 106. In one embodiment, the Agent packets 119 are transferred using UDP as a transport protocol. However, the server packets 117 may be received and sent at the servers 102 using TCP as a transport protocol.

In one embodiment, the Agents 106 each open a UDP socket. In one embodiment, the Manager 104 opens a UDP socket. To keep the tunnel between the Manager 104 and a given Agent 106 open, the Manager sends a keep-alive ping within a timeout period, in one embodiment. An example keep-alive ping is further discussed with respect to FIG. 4A.

In step 204, server packets 117 are captured at a network interface of a server 102. This may include capturing packets 117 that are received by or sent by the server 102. The packets 117 are received from or sent to network 107, in one embodiment. Network 107 is the Internet in one embodiment.

Step 204 may be performed at each of the servers 102. In one embodiment, these are TCP/IP packets. However, TCP/IP is not required. TCP is a reliable transmission protocol in which acknowledge messages are sent upon reception of packets. If a packet is not acknowledged within a certain time period, the sender is expected to re-send the packet. This can result in many packets being resent, resulting in heavy network congestion.

In one embodiment, the Agent 106 causes packets from a specific TCP port to be captured. The specific TCP port may be associated with the application 151. It is possible for the TCP port to be shared by an application or other software entity other than the application 151 being monitored. Therefore, the Agent 106 may perform some filtering to eliminate captured packets that are not associated with the application 151.

In step 206, the captured packets 117 are processed for efficient transfer to the manager 104. The forwarding of the packets should not interfere with performance of the application 151 being monitored. Step 206 could include compressing the captured packets to reduce network congestion. Step 206 could include sending multiple server packets 117 in one Agent packet 119. Further details of one embodiment are discussed in connection with FIG. 7.

In step 207, the Agent 106 determines whether the tunnel is still open. In one embodiment, the Agent 106 achieves this by determining whether the Manager 104 has sent a keep-alive pin message within a timeout period. If the tunnel is closed, then the process 200 ends. Otherwise, control passes to step 208.

In step 208, the captured server packets 117 are forwarded to the Manager 104. In one embodiment, the forwarding is over the tunnel opened in step 202. In one embodiment, UDP is used as the transport protocol.

In step 210, the Manager 104 generates application performance data based on analysis of the Agent packets 119. In one embodiment, the Manager 104 examines HTTP headers to determine what transaction is being processed in connection with the server packet 117. The Manager 104 could report on things such as average transaction times. Note that the Manager 104 may aggregate the Agent packets 119 from all of the Agents 106 to generate the application performance data.

In step 212, resource conditions are determined. Step 212 may be performed by the Agents 106 and/or the Manager 104. Step 212 may be performed at any time relative to the other steps in the process 200. Step 212 could include monitoring conditions on network 107. Step 212 could include monitoring the network interface on which the server packets 117 are received and sent. For example, an Agent 106 could monitor how many of the server packets 117 are dropped and how many of the server packets 117 are captured. In one embodiment, an Agent 106 reports such network conditions to the Manager 104.

Step 212 could include monitoring conditions on network 109. For example, the Manager 104 could monitor how many of the Agent packets 119 are not received at all, how many of the Agent packets 119 need to be re-sent, how many of the Agent packets 119 are received without any request for re-transmittal, etc. In one embodiment, the Manager 104 reports such network conditions to the relevant Agent 106. By the relevant Agent 106 it is meant the Agent 106 that send the Agent packets 119 to which the network statistics pertain.

Step 212 could include determining how much of the server's resources are being utilized by an Agent 106. For example, step 212 could determine how much CPU time is being used by an Agent 106. If an Agent 106 is using too much CPU time, this could negatively impact application performance. Other resource conditions could be determined in step 212.

Step 214 includes modifying the forwarding of the Agent packets 119 based on the resource conditions. This step can help to prevent degradation of performance of the application 151 and/or a service provided by the application 151. It is possible that the forwarding of the Agent packets 119 could add considerably to overall network traffic. This could negatively impact the reception and/or sending of the server packets 117. In one embodiment, process 200 automatically adapts to network conditions (e.g., network 107 and/or network 109) such that the forwarding of the Agent packets 119 does not interfere, or has minimal interference, with overall performance of the application 151 and services provided by the application 151, in one embodiment. In one embodiment, process 200 automatically adapts to other resource conditions, such as Agent CPU utilization. After step 214, the process 200 returns to step 204 for the capture and process of other server packets 117.

Figure 3:
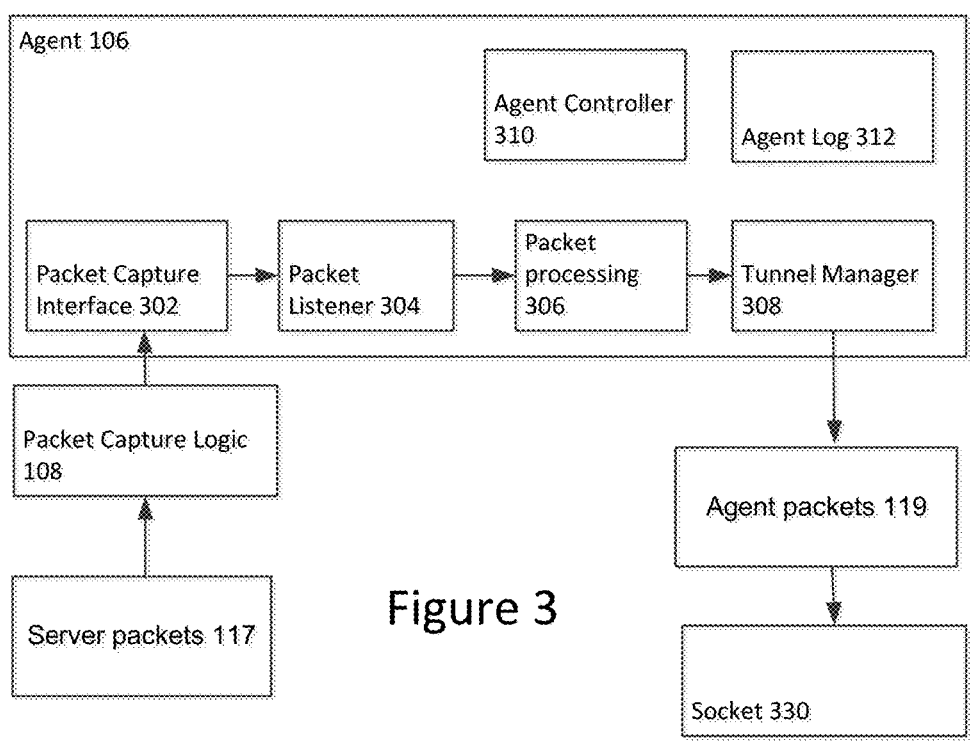
FIG. 3 is a diagram of one embodiment of an Agent, along with elements with which the Agent interacts.

FIG. 3 is a diagram of one embodiment of an Agent 106, along with elements with which the Agent 106 interacts. In general, the Agent 106 includes a packet capture interface 302, a packet listener 304, packet processing 306, tunnel manager 308, agent controller 310, and agent log 312. In one embodiment, the Agent 106 is implemented in software. Thus, the Agent 106 could be implemented as a set of computer program instructions that execute on a processor. The Agent 106 could be implemented in some combination of software and/or hardware.

The Agent 106 interfaces with packet capture logic 108. Packet capture logic 108 is able to capture packets that are received or sent by the server 102 (or other device). Packet capture logic 108 is sometimes referred to as a "packet sniffer." The packet capture logic 108 may capture packets received or sent by a network interface of the server 102. The packet capture logic 108 may be used to capture TCP/IP packets. In one embodiment, the Agent 106 instructs the packet capture logic 108 to capture packets on a certain TCP port. However, the packet capture logic 108 could capture packets transmitted using a different protocol.

The packet capture logic 108 may be implemented at least in part with computer program instructions that execute on a processor. An example of packet capture logic 108 is WinPcap that is provided by Riverbed Technology of San Francisco, Calif. UNIX systems may implement packet capture logic 108 in the libcap library. Note that the packet capture logic 108 is not required to be a software implementation. The packet capture logic 108 may be any combination of hardware and/or software.

The packet capture interface 302 of the Agent 106 interfaces with the packet capture logic 108 to access the captured server packets 117. In one embodiment, the packet capture logic 108 has an Application Program Interface (API) that allows access to the captured packets 117.

The packet listener 304 receives the server packets 117 from the packet capture interface 302 and makes the server packets 117 available to the packet processing 306. The packet listener 304 may perform maintenance functions. As noted above, it is possible that the packet capture logic 302 could receive packets that are not associated with the application 151. In one embodiment, the packet listener 304 performs filtering to eliminate captured packets that are not associated with the application 151.

The packet processing 306 processes the server packets 117 for efficient transfer to the manager 104. The packet processing 306 is able to compress the server packets 117 in one embodiment. The packet processing 306 may combine two or more of the server packets 117 when forming a single Agent packet 119. In some cases, a single server packet 117 may be spread over two Agent packets 119. This may be the case with a large server packet 117 when no compression is used, as one example. Packet processing 306 has a buffer for saving the Agent packets 119, in one embodiment. Thus, the Agent packets 119 may be re-sent to the Manager 104.

The tunnel manager 308 forwards the Agent packets 119 to the Manager 104, in one embodiment. The tunnel manager 308 manages the tunnel between the Agent 106 and the Manager 104. This may include opening a socket 330. The socket 330 is a UDP socket, in one embodiment. The tunnel manager 308 listens for keep-alive ping messages from the Manager 104, in one embodiment. If a keep-alive ping message is not received within a certain time period, the tunnel manager 308 stops transmitting the Agent packets 119.

The agent log 312 is used to store various information during operation. The agent log 312 provides logging functionality for other elements.

The agent controller 310 controls other elements in the Agent 106, in one embodiment. The agent controller 310 may also have a user interface that allows a user to enter various commands and configuration parameters. The configuration parameters could include agent properties. For example, a user could specify a criterion that defines a network condition for modifying the forwarding of the Agent packets 119. In one embodiment, the agent 106 receives a configuration file that specifies various configuration parameters.

The agent controller 310 creates an instance of the packet capture interface 302, the packet listener 304, the packet processing 306, and the tunnel manager 308, in one embodiment.

FIG. 4A and FIG. 4B depict two example packets that are sent from the Manager 104 to an Agent 106. FIG. 4A is a keep-alive ping packet 402, in accordance with one embodiment. This keep-alive ping packet 402 also contains statistics regarding packet loss pertaining to the Agent packets 119. The keep-alive ping packet 402 has a field named "timeout" whose value specifies a ping interval in, for example, seconds. If the Agent 106 does not receive the next ping from the Manager 104 within the timeout period, then the Agent 106 shuts down the tunnel and stops sending the Agent packets 119. This field may have any format and length. As one example, the field is an integer and has a length of 32 bits.

The keep-alive ping packet 402 has a field named "PacketLoss," whose value specifies the current packet loss for this Agent 106, as observed by the Manager 104. The packet loss may be specified in a number of ways. In one embodiment, the Manager 104 only sends negative acknowledgements when an Agent packet 119 is not received. In some cases, the Agent packet 119 may never be received by the Manager 104, even with one or more requests that the Agent packet 119 be re-sent. This could be defined as a lost packet. This field may have any format and length. As one example, the field is an integer and has a length of 32 bits.

FIG. 4B is a negative acknowledgment packet 404, in accordance with one embodiment. The negative acknowledgment packet 404 may be sent from the Manager 104 to the Agent 106 when the Manager 104 determines that an Agent packet 119 was not received. In one embodiment, the Manager 104 makes this determination by examining sequence numbers in the Agent packets 119. The negative acknowledgment packet 404 has a field named "MissingSeq", which is an array of sequence numbers that the Manager 104 wants the Agent 106 to resend. This field may have any format and length. As one example, the field is an array of integers, with each integer being 32 bits in length. The array could be any size; a size of 10 is one example.

Figure 5A:
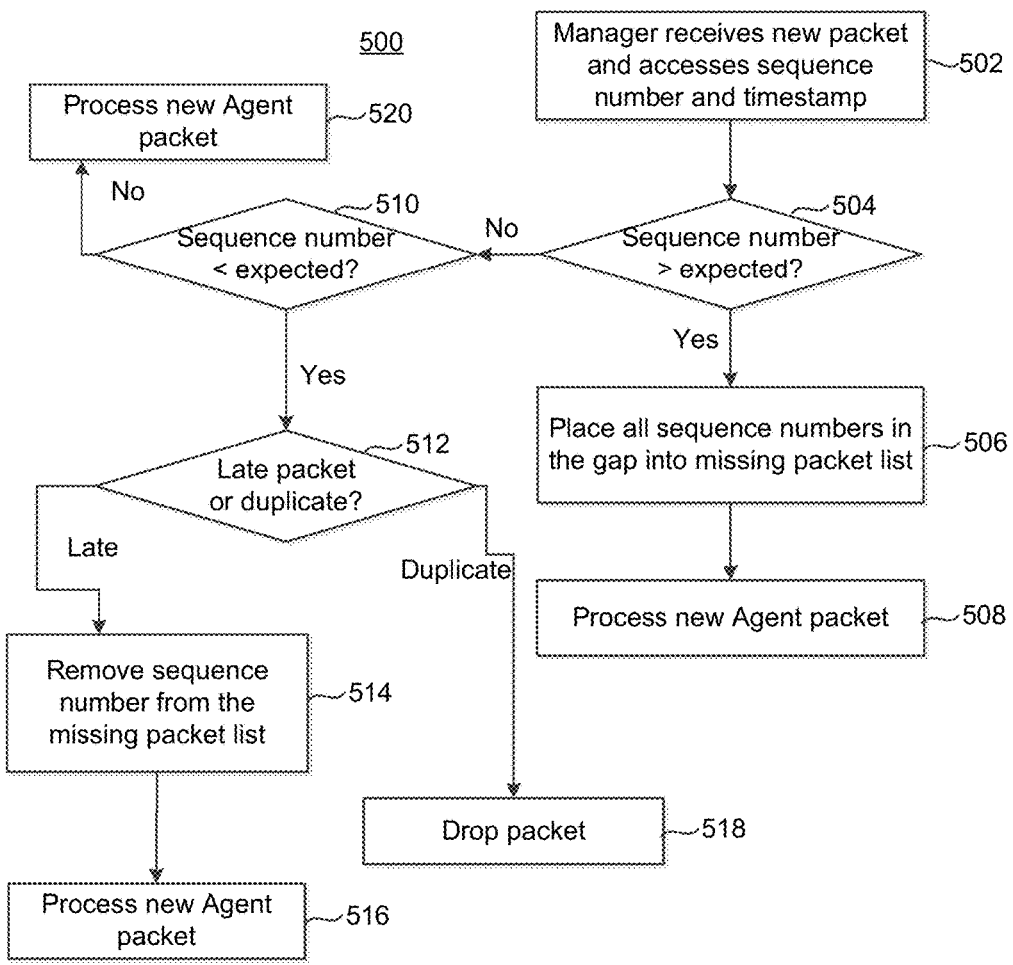
FIG. 5A is a flowchart of one embodiment of a process of the Manager 104 keeping track of whether packets are received.
Figure 5B:
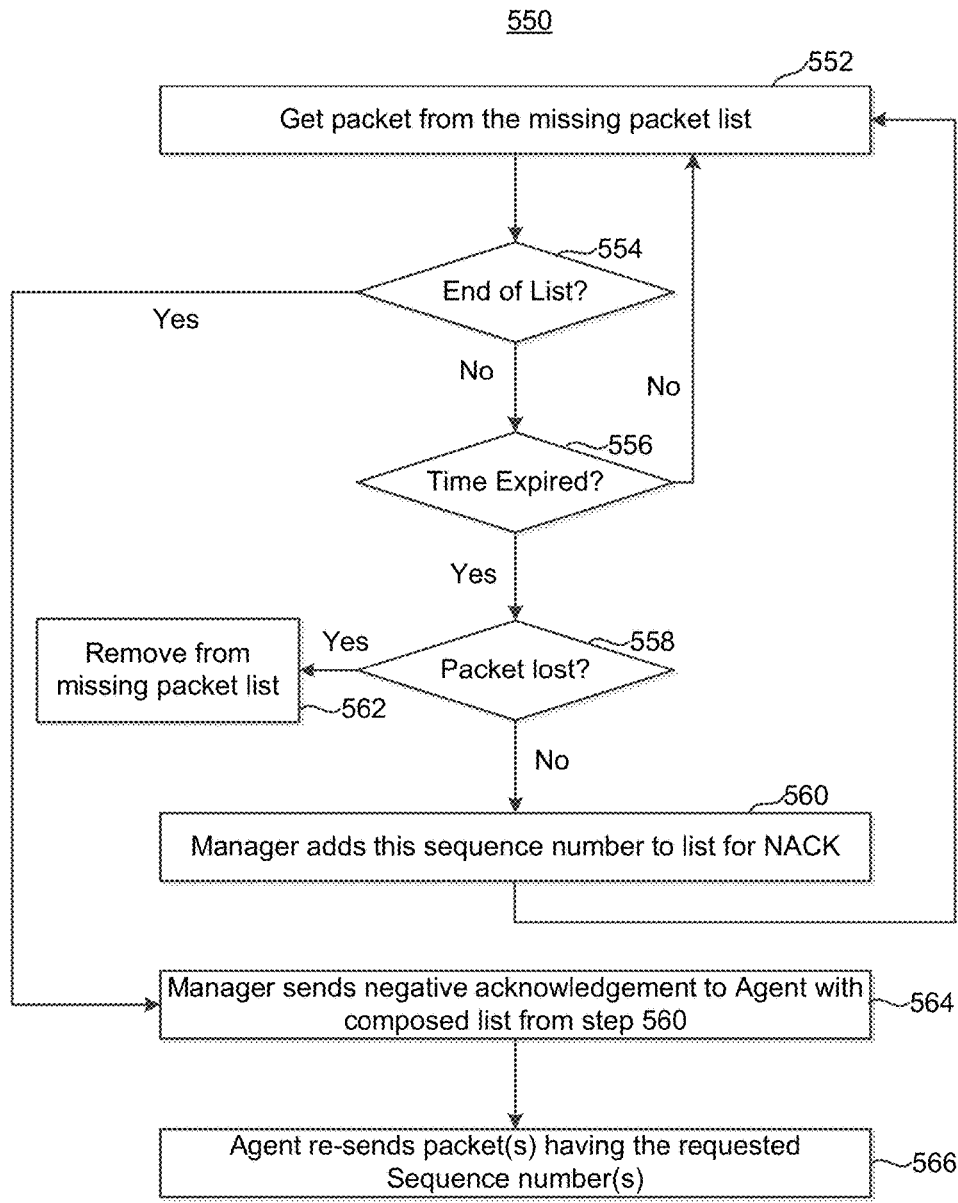
FIG. 5B is a flowchart of one embodiment of a process of the Manager sending negative acknowledgements for missing packets.

FIG. 5A is a flowchart of one embodiment of a process 500 of the Manager 104 keeping track of whether server Agent packets 119 are received. FIG. 5B is a flowchart of one embodiment of a process 550 of the Manager 104 sending negative acknowledgements (NACK) for missing Agent packets 119. These two processes may be used together.

In step 502 of FIG. 5A, the Manager 104 receives an Agent packet 119 from an Agent 106 and accesses a sequence number and timestamp from the Agent packet 119.

In step 504, the Manager 104 determines whether the sequence number is greater than expected. If so, this does not necessarily mean that an Agent packet 119 has been lost, as the Agent packets 119 could be received out of order. Thus, if step 504 is yes, the process 500 goes to step 506 to place all sequence numbers that are in the gap between the new sequence number and expected sequence number onto a missing packet list. The received Agent packet 119 may then be processed in step 508.

If the Manager 104 determined that the sequence number is not greater than expected (step 504=no), then the Manager 104 determines if the sequence number is less than expected, in step 510. This could indicate that the Agent packet 119 arrived late or is a duplicate packet, which is tested for in step 512. If it is a late arriving packet, then the Manager 104 removes this sequence number from the missing packet list in step 514. The Manager then processes the Agent packet 119 in step 516. If the Agent packet 119 is a duplicate, then the Manager 104 drops the Agent packet 119 in step 518.

If the Manager 104 determines that the sequence number for the new Agent packet 119 is as expected (step 510=no), then the new packet is processed in step 520.

FIG. 5B is a flowchart of one embodiment of a process 550 of the Manager 104 sending negative acknowledgements (NACK) for missing Agent packets 119. This process 550 may be performed after processing the new Agent packet 119 (e.g., after step 508 or 516 of FIG. 5A) and/or every so often if no new Agent packets 119 arrive. For example, the Manager 104 can initiate this process 550 every second, or some other time period, if no new Agent packets 119 arrive within that time period.

In step 552, the Manager 104 evaluates the missing Agent packet 119 list for missing Agent packets 119. The Manager will send a NACK for each missing Agent packet 119, providing certain conditions are met, in one embodiment. Step 554 test whether an end of a list of missing packets is reached. This represents a test to determine whether there are any more sequence numbers in the missing packets list. If there are more packets on the list, control passes to step 556 to process this sequence number.

In step 556, the Manager 104 determines whether a time period for receiving the Agent packet 119 having the missing sequence number has expired. If time has expired, control passes to step 558 to perform a further test to determine whether to send a NACK. If time has not expired (step 556=no), then control passes to step 552 to determine whether there are any more missing Agent packets 119.

In step 558, the Manager 104 determines whether the Agent packet 119 is likely to be lost such that a NACK should not be sent. In one embodiment, the Manager 104 tracks whether it is unlikely that the Agent 106 will be able to re-send the missing Agent packet 119. If so, the Manager then stops sending NACKs and removes this sequence number from the missing packet list in step 562. The Manager 104 may know the size of a resend buffer of the Agent 106 and determine whether the missing Agent packet 119 is no longer on the Agent's resend buffer based on the current expected packet sequence number.

If the Manager 104 determines that the Agent packet 119 is not lost (step 558=no), then control passes to step 560. In step 560, the Manager 104 adds this sequence number to a list of sequence numbers to include in a NACK. The process 550 then returns to step 552 to determine whether there are any more missing Agent packets 119.

Eventually, all missing sequence numbers are processed (step 554=yes). Control then passes to step 564. In step 564, the Manager 104 sends a NACK that references all missing sequence numbers. This assumes that the process 550 has indeed determined that a NACK should be sent. That is, this assumes that at some point the Manager 104 added a sequence number to the list in step 560. Process 550 employs the negative acknowledge packet 404 of FIG. 4B, in one embodiment.

In step 566, the Agent 106 re-sends the Agent packet 119 for each of the missing sequence numbers, if possible. As stated above, in some cases the Agent 106 may no longer have the packet that corresponds to the missing sequence number. In one embodiment, there is a limited number of re-sends. Either the Manager 104 or the Agent 106 can track the number or re-sends.

FIG. 6A is a basic structure for one embodiment of an Agent packet 119 that the Agent 106 sends to the Manager 104. The Agent packet 119 has an Agent Header 602, which may include general information about the Agent packet 119. Next, are one or more "packet structure headers" 604(1)-604(n) followed by a "captured packet". The captured packets 606(1)-606(n) are based on the captured server packets 117, although they may be compressed. Compression is not necessarily on a server packet 117 by server packet 117 basis. In other words, compression can be performed on a portion of the Agent packet 119 that includes multiple server packets 119. Also, it is not required that the captured packet 606 in the Agent packet 119 contain every portion of the corresponding server packet 117. The packet structure that precedes a given captured packet 606 provides details such as length of the following captured packet 606. In this example, there are "n" captured packets 606(1)-606(n) in the Agent packet 119.

FIG. 6B is a basic structure for one embodiment of a statistics packet 620 that the Agent 106 sends to the Manager 104. The statistics packet 620 has the Agent header 602, which may have the same basic structure as the Agent header 602 in an Agent packet 119, although with different flags set. In one embodiment, one of the flags in the Agent header 602 indicates whether what follows is the structure of FIG. 6A or 6B.

The Agent Statistics 624 are the statistics about network conditions that the Agent 106 collects, in one embodiment. FIG. 6F, to be discussed below, provides further details of one embodiment.

FIG. 6C is a diagram of one embodiment of an Agent header 602. This may be used for the Agent header 602 in either FIG. 6A or 6B. The Agent header 602 has a field named "Sequence." The Sequence is a monotonically increasing sequence number starting at one, in one embodiment. The sequence may wrap around after reaching a certain value. In one embodiment, this field is an integer and could be 16 bits, although a different size field could be used.

The Agent header 602 also has flags. Example flags are shown in FIG. 6D. If the flag FLAG_AGENT_SHUTDOWN is set this indicates that the Agent 106 has been shut down for bad network conditions. In this case, no data follows. That is, the Agent 106 does not forward server packets 117.

If the flag FLAG_AGENT_COMPRESSION is set this indicates that content following the Agent header 602 is compressed. Different portions of the content may be compressed using different techniques. For example, headers could be compressed with one technique and data with another technique.

If the flag FLAG_AGENT_RESEND is set this indicates that this is an Agent packet 119 that is resent because of NACK command 404 from the Manager 104.

If the flag FLAG_AGENT_STATS is set this indicates that this is an Agent statistics message 620 instead of an Agent packet 119. This flag may be set to indicate whether the basic structure is that of the Agent packet 119 of FIG. 6A or the Agent statistics message 620 of FIG. 6B.

FIG. 6E is a diagram of one embodiment of a packet structure header 604. As noted in the discussion of FIG. 6A, the packet structure header 604 may be used to indicate details of the captured packet 606 in the Agent packet 119. The packet structure 604 has a field named "length," which is the length of following captured packet without the packet structure header 604.

The packet structure header 604 has a field named Tv_sec, which is the PCAP timestamp seconds. The packet structure header 604 has a field named Tv_usec, which is the PCAP timestamp micro-seconds.

FIG. 6F is a diagram of one embodiment of a statistics structure 624. As noted in the discussion of FIG. 6B, the statistics structure 624 may be used to indicate details of the statistics in the Agent statistics packet 620. The statistics structure 624 has a field named "captured," which is a cumulative count of captured server packets 117 at the server 102 at which the Agent 106 resides. The statistics structure 624 has a field named "dropped," which is a cumulative count of dropped server packets 117 at the capture interface.

In one embodiment, the Agent 106 obtains statistics of captured and dropped packets from the packet capture logic 108. These statistics do not necessarily correspond to captured and dropped packets associated with the application 151. For example, the captured and dropped packets might be for packets associated with a particular TCP port, which could include packets associated with the application 151 and possibly another software entity. In one embodiment, the Agent 106 queries the operating system for such statistics.

Figure 7:
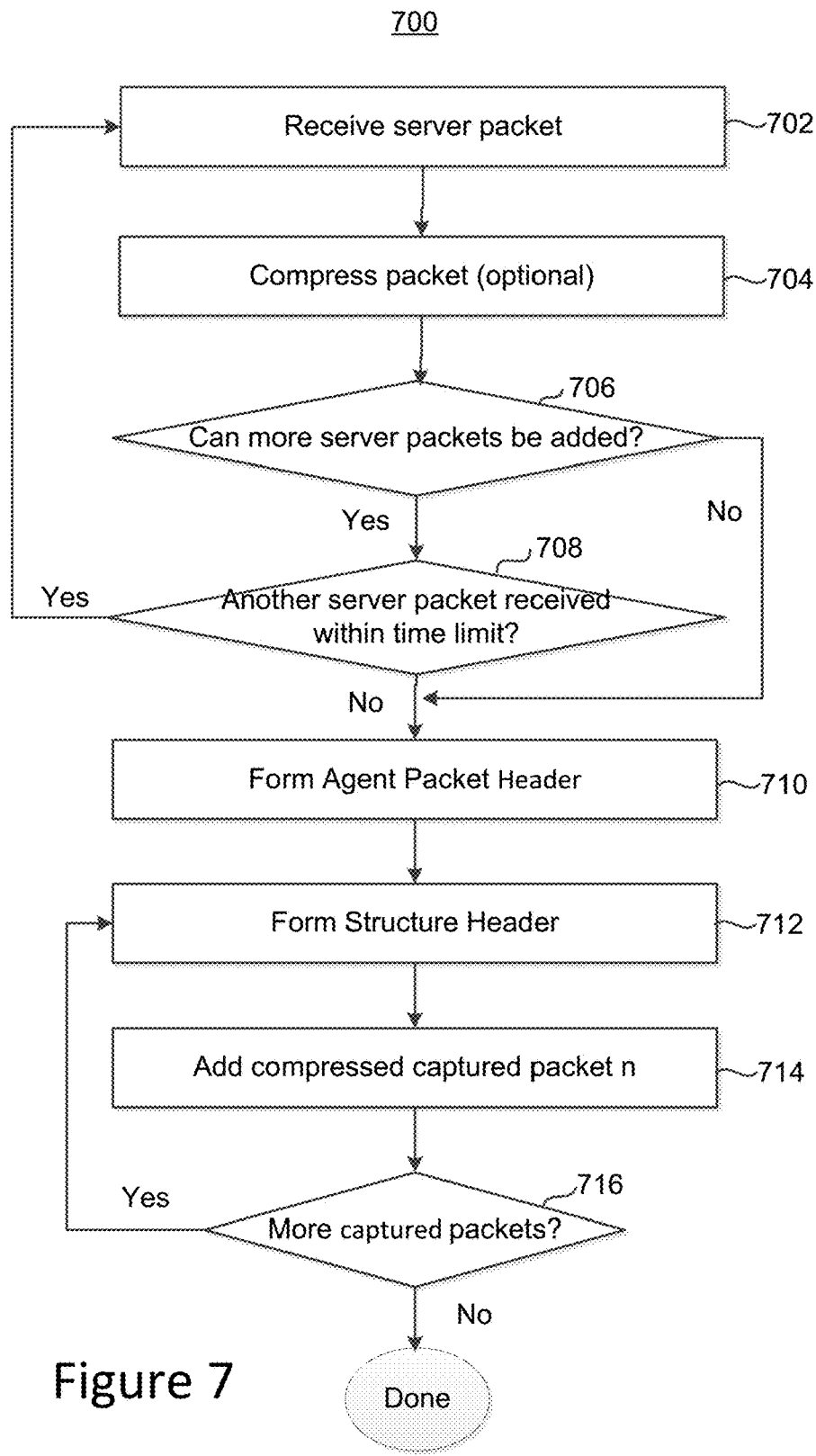
FIG. 7 is a flowchart of one embodiment of a process of an Agent processing server packets such that they are suitable to transfer to the Manager.

FIG. 7 is a flowchart of one embodiment of a process 700 of an Agent 106 processing server packets 117 such that they are suitable to transfer to the Manager 104. In process 700, the Agent 106 forms Agent packets 119. Process 700 is one way that the Agent 106 processes the captured server packets 117 for efficient transfer of step 206 of FIG. 2.

In step 702, the Agent 106 receives a captured packet 117. In one embodiment, the packet capture interface 302 is used to access the server packet 117 from the packet capture logic 108. The packet capture interface 302 may provide the server packet 117 to the packet listener 304. The packet listener 304 may inform the packet processing 306 that a new server packet 117 has been captured. In one embodiment, the server packet 117 is a TCP/IP packet.

In optional step 704, the server packet 117 is compressed. Compressing the server packet 117 is optional. A wide variety of compression techniques may be used. In one embodiment, the entire server packet 117 is compressed. For example, an entire TCP/IP packet is compressed. Step 704 could be performed by packet processing 306 of the Agent 106. Compression could be performed at another point in the process 700.

Note that it is not a requirement that the entire server packet 117 be transmitted to the Manager. For example, it is possible that certain information such as an HTTP header might be sent, whereas segment data might not be sent to the Manager 104.

In step 706, the Agent 106 determines whether additional server packets 117 can be included in the Agent packet 119. In one embodiment, the Agent 106 attempts to make the Agent packet 119 as large as the Maximum Transfer Unit (MTU) of the network 109 will permit.

If step 706 is yes, then the Agent 106 can possible add another server packet 117. However, the Agent 106 will not necessarily wait for a substantial time for another server packet 117 to be captured. Thus, if another server packet 117 is not captured within a time limit (step 708=no), the control passes to step 710 to form the Agent packet 119. The time limit can be any amount of time, including infinity, which essentially removes this test.

However, if another server packet 117 is captured within the time limit (step 708=yes), then control passes to step 702 to access another server packet 117. Eventually, either step 706 or 708 will result in control passing to step 710. In step 710, the Agent 106 forms the Agent packet header 602. An example Agent packet header 602 is depicted in FIG. 6C. The Agent 106 adds the sequence number to the header in step 710. The Agent 106 also sets the flags, such as those in the example of FIG. 6D. In this example, the flag for compression is set. The other flags are not set in this example. Since the "FLAG_AGENT_STATS" flag is not set, this indicates that this is an Agent packet 119, as opposed to an Agent statistics packet 620.

In step 712, the Agent 106 forms the packet structure header 604 for the first captured packet 606(1). The Agent 106 sets the length field as appropriate for the length of the compressed captured packet 606(1). The Agent 106 sets the timestamp for the captured packet 606(1) as appropriate.

In step 714, the Agent appends the captured packet 606(1) after the packet structure header 604. As noted, this may be compressed in step 704. However, compression could be performed at a different point and is not required. In one embodiment, the Agent 106 waits until the data to be transferred reaches the MTU prior to performing compression. If the compression significantly reduces the data, then compression may be used. Otherwise, the gent 106 may decide not to use compression. The Agent 106 may even add more server packets to the others (uncompressed) and then compress all of them so that even more data may be sent within the MTU.

The Agent then determines whether there are more captured packets 606 to add to the Agent packet 119 in step 716. If there are (step 716=yes), then control passes to step 712 to form the packet structure header 604 for the next captured packet 606(2). Then, the Agent appends the next captured packet 606(2) after the packet structure header 604 just formed. Eventually step 706 indicates that there are no more captured packets 606 to add to the Agent packet 119 and the process 700 ends. The Agent 106 may then transmit the Agent packet 119 to the Manager 104.

Process 700 provides details of one embodiment of forming the Agent packets 119. Many other variations are possible. In one embodiment, process 700 includes compressing server packets 117 and adding Agent Packet headers to an Agent packet 119. Note that the server packets 117 are not necessarily compressed individually, but a group of the server packets 117 may be compressed as a larger unit of data. This larger unit of data may include data other than the server packets 117.

Figure 8A:
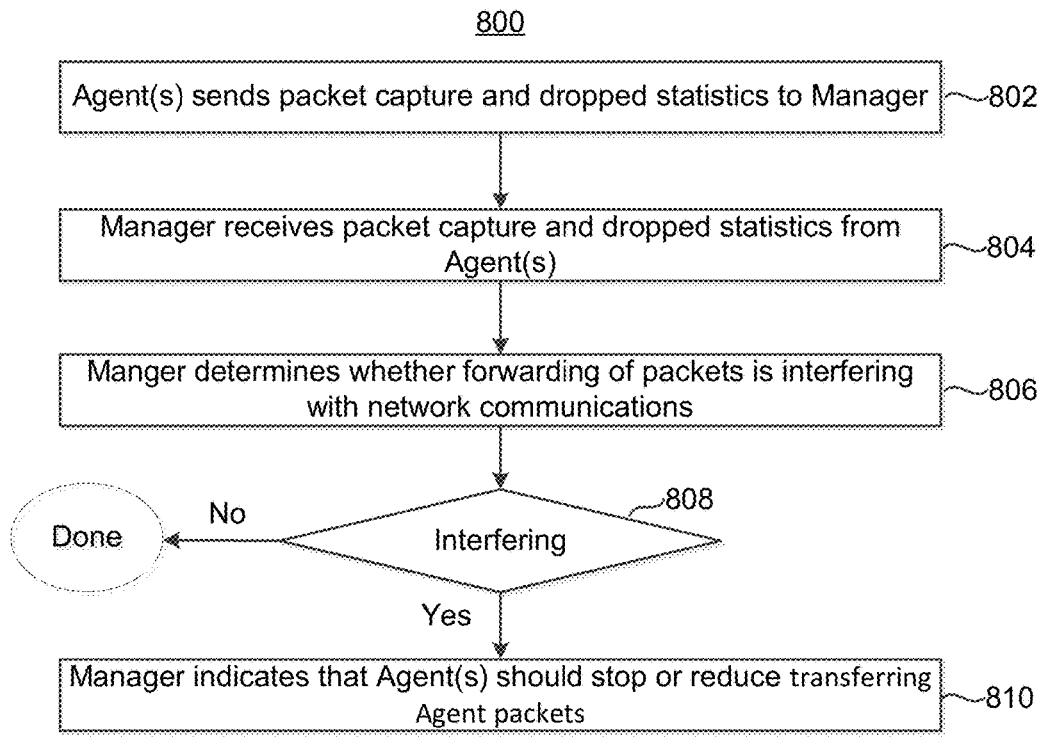
FIG. 8A shows one embodiment of a process of the Agents sending packet capture statistics to the Manager.
Figure 8B:
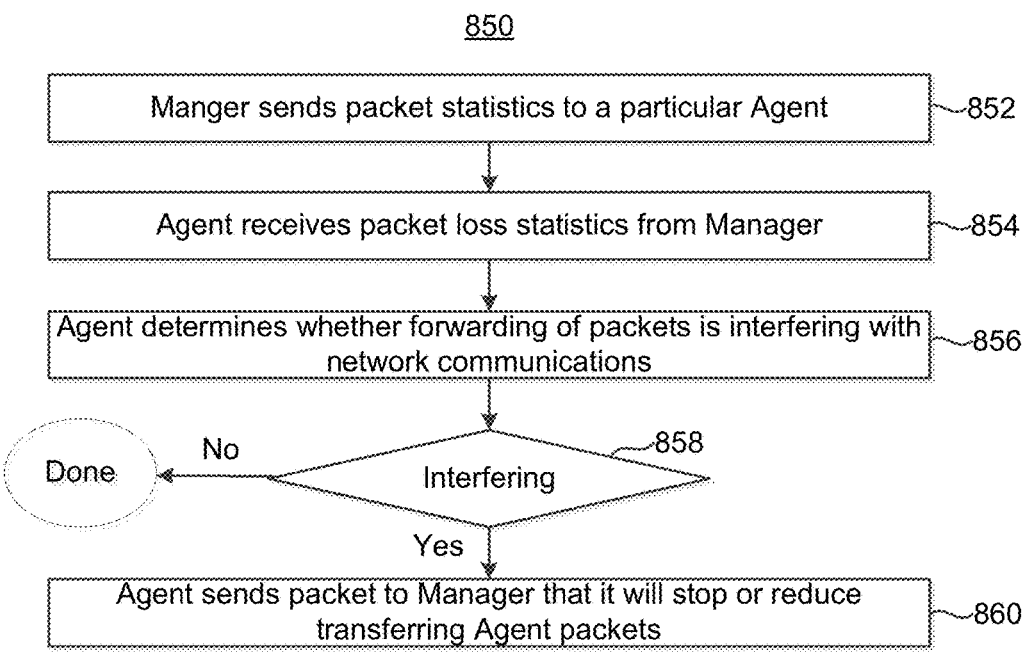
FIG. 8B shows one embodiment of a process of the Agents receiving packet statistics from the Manager.

As noted in process 200, the Agents 106 may resource conditions, and the forwarding of the captured packets may be modified based on resource conditions. FIG. 8A and FIG. 8B show different embodiments of monitoring network conditions and determining whether to modify forwarding of packets based on network conditions. These are different embodiment of steps 212-214 of FIG. 2.

FIG. 8A involves the Agents 106 sending packet capture statistics to the Manager 104. In step 802, Agents 106 send packet capture and dropped statistics to the Manager 104. In one embodiment, the Agents 106 send an Agent statistics packet 620, an example of which was discussed in FIG. 6B. Also, FIG. 6F depicts one embodiment of the statistics structure 624. Agents 106 may send these statistics at any point in time. There is no requirement that these statistics be sent with any regularity, although that is one possibility.

In step 804, the Manager 104 receives the packet capture statistics from the Agents 106. In step 806, the Manager 104 determines whether transfer of Agent packets 119 might be interfering with network communications and/or application performance. Numerous techniques may be used to make this judgment. In one embodiment, the Manager 104 totals all of the captured and dropped server packets 117 reported by all of the Agents 106 over some time interval. The Manager could make an assessment based on Agent statistics from fewer than all of the Agents 106. In the simplest case, the Manager makes an assessment based on Agent statistics from a single Agent 106.

Then, the Manager 104 compares these statistics to some criterion. One example of a criterion is the ratio of dropped server packets 117 to captured serer packets 117. This criterion could be specified by the user. If the Manager 104 determines that the criterion is not met (step 808=no), then the process 800 ends.

However, if the Manager 104 determines that the criterion is met (step 808=yes), then the control passes to step 810. If the criterion is met, this indicates that network 107 has high traffic, in one embodiment. This may indicate that the servers 102 are busy processing network traffic on network 107. As noted, in some embodiments, network 109 is a different network from 107. However, additional processing on network 109 could have a negative impact on the server's ability to process traffic on network 107. Also, in some embodiments, networks 107 and 109 are the same. Therefore, at times when traffic on network 107 is high, additional traffic on network 109 may be especially harmful.

In step 810, the Manager 104 indicates to some set of the the Agents 106 that the Agents 106 should stop or reduce transferring Agent packets 119. This indication could be provided to all of the Agents 106, a single one of the Agents 106, or any other set of the Agents 106. Note that even of the determination of steps 806-808 was based on statistics from fewer than all of the Agents 106, the Manager 104 could still tell all of the Agents 106 to stop forwarding packets.

Providing the indication to the Agents 106 may be achieved by failing to send the keep-alive ping 402. Therefore, the Agents 106 will take this as an instruction that they should no longer send the Agent packets 119.

One alternative to indicating that the Agents 106 should stop forwarding packets is to tell the Agents 106 to reduce the amount of reporting in some manner. The Agents 106 might be informed that only some of the server packets 117 should be forwarded. The Agents 106 might be informed that compression should be used if it was not being used. The Agents 106 might be informed to change the type of compression such that the compression ratio is higher. The Agents 106 might be instructed to send only a portion of each server packet 117, such as an HTTP header. Many other possibilities exist.

FIG. 8B involves an Agents 106 receiving packet statistics from the Manager 104. In step 852, the Manager 104 sends packet statistics to a particular Agent 106. In one embodiment, the Manager 104 sends the statistics in a keep-alive ping packet 402, such as the example in FIG. 4A.

However, the packet statistics could be sent in some other packet, and are not required to be sent in a keep-alive ping packet 402. There is no requirement that these statistics be sent with any regularity, although that is one possibility.

In step 854, the Agent 106 receives the packet loss statistics from the Manager 104. In step 856, the Agent 106 determines whether transferring of Agent packets 119 is interfering with network communications. Numerous techniques may be used to make this judgment. In one embodiment, the Agent 106 compares these statistics to some criterion. One example of a criterion is the percentage of lost Agent packets 119 out of all Agent packets 119 sent. This criterion could be specified by the user. If the Manager 104 determines that the criterion is not met (step 858=no), then the process 850 ends.

However, if the Agent 106 determines that the criterion is met (step 858=yes), then the control passes to step 860. In other words, the Agent 106 determines that forwarding the Agent packets 119 is interfering with network communication. In step 860, the Agent 106 indicates to the Manager 104 that it will stop transmitting Agent packets 119. In one embodiment, the Agent 106 sets a flag in the header of an Agent packet 119. For example, the FLAG_AGENT-_SHUTDOWN depicted in FIG. 6D is set.

Figure 9:
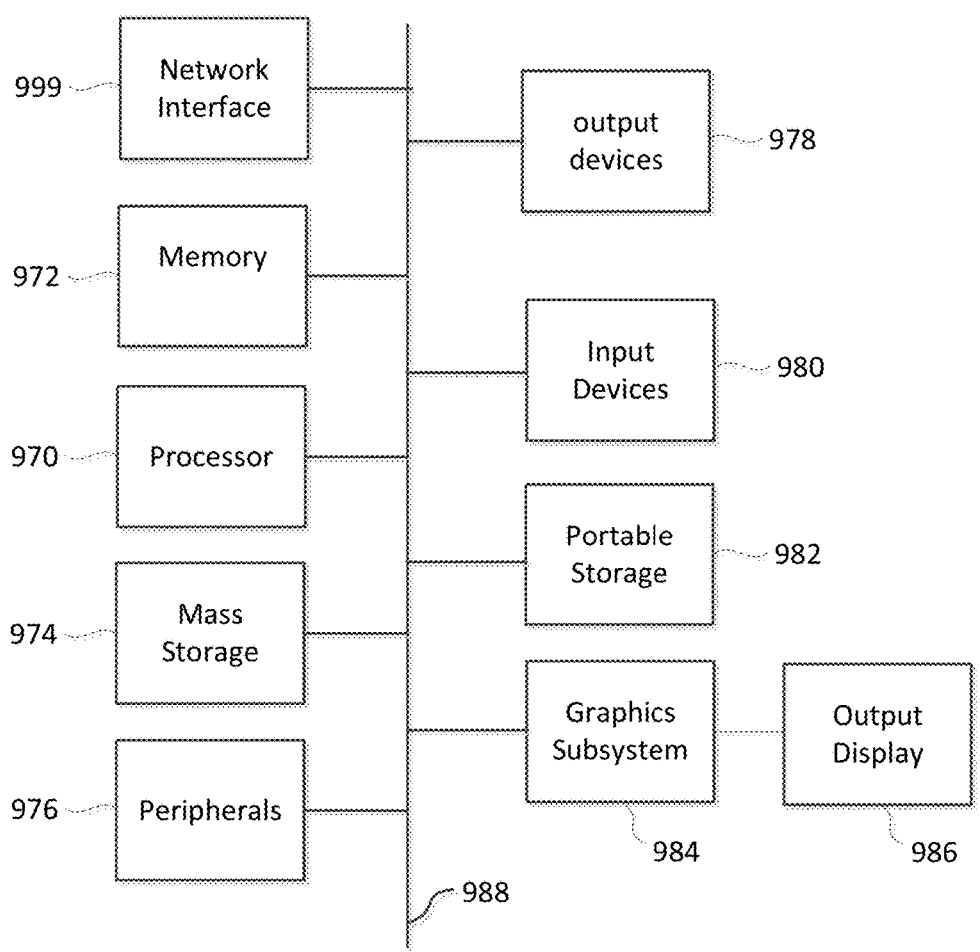
FIG. 9 illustrates a high level block diagram of a computer system which can be used to implement the technology described herein.

FIG. 9 illustrates a high level block diagram of a computer system which can be used to implement the technology described herein. The computer system could be used to implement server 102, manager compute node 104, etc. In some cases, multiple computer systems are used to implement one of the foregoing.

The computer system of FIG. 9 includes a processor unit 970 in communication with main memory 972. Processor unit 970 may contain a single microprocessor, or may contain a plurality of microprocessors for configuring the computer system as a multi-processor system. These one or more processors can perform the methods described above. Main memory 972 stores, in part, instructions and data for execution by processor unit 970. If the system described herein is wholly or partially implemented in software, main memory 972 can store the executable code when in operation. Main memory 972 may include banks of dynamic random access memory (DRAM) as well as high speed cache memory. For example, main memory 972 can store the server packets 117, agent packets 119, configuration parameters for an Agent 106, etc.

The system of FIG. 9 further includes a mass storage device 974, peripheral device(s) 976, user input device(s) 980, output devices 978, portable storage medium drive(s) 982, a graphics subsystem 984, network interface 999, and an output display 986. For purposes of simplicity, the components shown in FIG. 9 are depicted as being connected via a single bus 988. However, the components may be connected through one or more data transport means. For example, processor unit 970 and main memory 972 may be connected via a local microprocessor bus, and the mass storage device 974, peripheral device(s) 976, portable storage medium drive(s) 982, and graphics subsystem 984 may be connected via one or more input/output (I/O) buses. Mass storage device 974, which may be implemented with a magnetic disk drive or an optical disk drive, is a non-volatile storage device for storing data and instructions for use by processor unit 970. In one embodiment, mass storage device 974 stores the system software for implementing the technology described herein for purposes of loading to main memory 972. Peripheral device(s) 976 may include any type of computer support device, such as an input/output (I/O) interface, to add additional functionality to the computer system. The network interface 999 is for connecting the computer system to a network, a modem, a router, etc. Network interface 999 may be used to connect to network 107 and/or network 109. Network interface 999 may be used to connect to any network including, but not limited to, a LAN, WAN, or the Internet.

User input device(s) 980 provides a portion of a user interface (e.g., to allow user to enter configuration information for configuring Agent 106, etc.). User input device(s) 980 may include an alpha-numeric keypad for inputting alpha-numeric and other information, or a pointing device, such as a mouse, a trackball, stylus, or cursor direction keys. In order to display textual and graphical information, the computer system of FIG. 9 includes graphics subsystem 984 and output display 986. Output display 986 may include a cathode ray tube (CRT) display, liquid crystal display (LCD) or other suitable display device. Graphics subsystem 984 receives textual and graphical information, and processes the information for output to display 986. Additionally, the system of FIG. 9 includes output devices 978. Examples of suitable output devices include speakers, printers, network interfaces, monitors, etc.

The components contained in the computer system of FIG. 9 are those typically found in computer systems suitable for use with the technology described herein, and are intended to represent a broad category of such computer components that are well known in the art. Thus, the computer system of FIG. 9 can be a personal computer, mobile computing device, smart phone, tablet, workstation, server, minicomputer, mainframe computer, or any other computing device. The computer can also include different bus configurations, networked platforms, multi-processor platforms, etc. Various operating systems can be used.

One embodiment includes a system, comprising a network interface, and a processor that is configured as follows. The processor is configured to open a communication tunnel between an agent that executes on the processor and a manager on compute node over a network. An application to be monitored executes on the processor. The processor is configured to access first packets that are captured at the network interface. The first packets are associated with the application. The processor is configured to form second packets that comprise the captured first packets. The processor is configured to transfer the second packets over the network to the manager. The processor is configured to monitor resource conditions. The processor is configured to modify the transfer of the second packets based on the resource conditions.

One embodiment includes computer program product comprising a computer readable storage medium comprising computer readable program code embodied therewith. The computer readable program code comprises computer readable program code configured to access first packets that are received by each of a plurality of application servers. Instances of an application to be monitored execute on the plurality of application servers. The computer readable program code is configured to process the first packets for efficient network transfer, comprising forming second packets that comprise the first packets, the second packets are as close as possible to a maximum transfer unit (MTU) of a network. The computer readable program code is configured to transfer the second packets over the network to a manager node executing on a computing device. The computer readable program code is configured to monitor conditions of the network. The computer readable program code is configured to modify the transfer of the second packets based on the conditions of the network.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, material s, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of monitoring an application, comprising:
    for each of a plurality of agents on a corresponding plurality of electronic devices, opening a User Datagram Protocol (UDP) communication tunnel over a network between the respective agent and a manager on a different electronic device, the application executes on the plurality of electronic devices;
    accessing, by the agents, Transmission Control Protocol/Internet Protocol (TCP/IP) packets associated with the application that are transferred over respective network interfaces of the plurality of electronic devices, ones of the TCP/IP packets comprising an Hypertext Transfer Protocol (HTTP) header;
    forming first UDP packets, by the agents, that each comprise one or more of the HTTP headers;
    transferring the first UDP packets from the agents to the manager over the UDP communication tunnels;
    generating application performance data based on the HTTP headers in the first UDP packets received at the manager;
    transferring statistics from the agents to the manager in second UDP packets over the UDP communication tunnels about captured and dropped TCP/IP packets at the respective network interfaces;
    determining, by the manager analyzing the statistics, that transferring the first and second UDP packets has a negative impact on receiving the TCP/IP packets at the respective network interfaces that exceeds a criterion; and
    modifying communication over the UDP communication tunnels when the manager determines transferring the first and second UDP packets has a negative impact on receiving the TCP/IP packets that exceeds the criterion, comprising reducing or halting the transferring of the first UDP packets over the UDP communication tunnel from at least one of the agents.

2. The method of claim 1, wherein the manager sends a negative acknowledgement if one of the first UDP packets is not received but does not send a positive acknowledgment in response to receiving one of the first UDP packets.

3. The method of claim 1, further comprising:
    tracking, by the manager, how many of the first UDP packets are not received by the manager;
    sending packet statistics regarding the first UDP packets from the manager to a second of the agents;
    the second agent determining whether transferring of the first UDP packets is interfering with receiving the TCP/IP packets based on the first UDP packet statistics from the manager; and
    the second agent sending a message to the manager that the second agent will stop sending first UDP packets in response to the determination that transferring the first UDP packets is interfering with receiving the TCP/IP packets.

4. The method of claim 1, wherein forming a given one of the first UDP packets comprises:
    compressing a plurality of the TCP/IP packets;
    adding a header to the given first UDP second packet comprising a sequence number of first UDP packets sent from the agent to the manager;
    adding fields for a length of each of the compressed TCP/IP packets to the given first UDP packet; and
    adding the compressed TCP/IP packets as data to the given first UDP packet.

5. A system, comprising:
    a network interface; and
    one or more processors configured to:
        open a User Datagram Protocol (UDP) communication tunnel between an agent that executes on a first of the processors and a manager that executes on a second of the processors over a network from the first processor, wherein an application executes on the first processor;
        access Transmission Control Protocol/Internet Protocol (TCP/IP) packets that are captured at the network interface, wherein the TCP/IP packets are associated with the application and comprise Hypertext Transfer Protocol (HTTP) headers;
        form first UDP packets that each comprise one or more of the HTTP headers;
        transfer the first UDP packets over the UDP communication tunnel to the manager;

generate application performance data based on the HTTP headers in the first UDP packets received at the manager;

transfer statistics from the agent to the manager in second UDP packets over the UDP communication tunnel regarding the number of captured and dropped TCP/IP packets at the network interface;

determine that transferring the first and second UDP packets has a negative impact on receiving the TCP/IP packets at the network interface that exceeds a criterion by the manager analyzing the statistics; and modify communication over the UDP communication tunnel when the manager determines that transferring the first and second UDP packets has a negative impact on receiving the TCP/IP packets that exceeds a criterion, comprising the processor being configured to reduce or halt the transferring of the first UDP packets over the UDP communication tunnel.

6. The system of claim 5, wherein the processor being configured to form first UDP packets that each comprise one or more of the HTTP headers comprises the processor being configured to:
compress a plurality of the TCP/IP packets;
add a header to a given one of the first UDP packets, the header comprising a sequence number;
add fields for a length of each of the compressed TCP/IP packets to the given first UDP packet; and
add the compressed TCP/IP packets to the given first UDP packet, the number of TCP/IP packets in the given first UDP packet is such that the given first UDP packet is as close as possible to a maximum transfer unit (MTU) of the network.

7. The system of claim 5, wherein the processor is further configured to receive statistics of how many of the first UDP packets are dropped by the manager; and
wherein the processor being configured to modify communication over the UDP communication tunnel when transferring the first UDP packets has a negative impact on receiving the TCP/IP packets that exceeds a criterion comprises the processor being configured to stop the transfer of the first UDP packets in response to the percentage of dropped first UDP packets exceeding a threshold, wherein at least some of the HTTP headers that would have otherwise been transferred in the first UDP packets are never transferred to the manager.

8. The system of claim 5, wherein the processor being configured to open a UDP communication tunnel comprises the processor being configured to open a UDP socket, wherein the processor is further configured to listen for keep-alive pings from the manager on the UDP socket and to stop transferring the first UDP packets if a keep-alive ping is not received within a timeout.

9. The system of claim 5, wherein the agent and the manager are in the same local area network.

10. A computer program product comprising:
a computer readable storage device comprising computer readable program code embodied therewith, the computer readable program code comprising:
computer readable program code configured to access Transmission Control Protocol/Internet Protocol (TCP/IP) packets at each of a plurality of application servers, wherein instances of an application to be monitored execute on the plurality of application servers, wherein the TCP/IP packets are sent or received by the instances of the application, ones of the TCP/IP packets comprising an Hypertext Transfer Protocol (HTTP) header;
computer readable program code configured to open a User Datagram Protocol (UDP) communication tunnel between each of the application servers and a manager on a computing device over a network;
computer readable program code configured to process ones of the TCP/IP packets for efficient network transfer, comprising forming first UDP packets that each comprise one or more of the HTTP headers, the first UDP packets are as close as possible to a maximum transfer unit (MTU) of the network;
computer readable program code configured to transfer the first UDP packets over the UDP communication tunnels from the application servers to the manager;
computer readable program code configured to generate application performance data based on the HTTP headers in the first UDP packets received in the first UDP packets at the manager;
computer readable program code configured to monitor captured and dropped TCP/IP packets received at network interfaces of the application servers;
computer readable program code configured to transfer statistics regarding the number of captured and dropped TCP/IP packets to the manager in second UDP packets over the UDP communication tunnels;
computer readable program code configured determine that transferring the first and second UDP packets over the UDP communication tunnels has a negative impact on receiving the TCP/IP packets at the network interfaces that exceeds a criterion, by the manager analyzing the number of captured and dropped TCP/IP packets; and
computer readable program code configured to modify communication over the UDP communication tunnels when the manager determines that transferring the first and second UDP packets has a negative impact on receiving the TCP/IP packets that exceeds a criterion, comprising computer readable program code configured to shut down a first of the UDP communication tunnels.

11. The computer program product of claim 10, wherein the computer readable program code configured to process the ones of the TCP/IP packets for efficient network transfer comprises:
computer readable program code configured to compress a plurality of the TCP/IP packets;
computer readable program code configured to add a header to a given one of the first UDP packets, the header comprising a sequence number;
computer readable program code configured to add fields for a length of each of the compressed TCP/IP packets to the given first UDP packet; and
computer readable program code configured to add the compressed TCP/IP packets to the given first UDP packet.

12. The computer program product of claim 11, wherein the computer readable program code configured further comprises:
computer readable program code configured to re-transfer a specified first UDP packet upon receiving a negative acknowledgement from the manager that the specified first UDP packet was not received over the UDP communication tunnel.

13. The computer program product of claim 10, further comprising:
computer readable program code configured to listen for keep-alive ping messages from the manager with respect to each of the UDP communication tunnels; and computer readable program code configured to stop transferring the first UDP packets over a given UDP communication tunnel if the keep-alive ping is not received over the given UDP communication within a timeout period.

14. The method of claim 1, further comprising:
receiving user input that specifies the criterion for modifying the communication over the UDP communication tunnel.

15. The method of claim 1, wherein the reducing or halting the transferring of the first UDP packets over the UDP communication tunnel from the at least one of the agents comprises shutting down the UDP communication tunnel between a first agent and the manager.

16. The system of claim 5, wherein to reduce or halt the transferring of the first UDP packets over the UDP communication tunnel the processor is configured to shut down the UDP communication tunnel between the agent and the manager.

\* \* \* \* \*